United States Patent
Gu et al.

(10) Patent No.: US 10,445,584 B2
(45) Date of Patent: Oct. 15, 2019

(54) VIDEO ANALYSIS FOR 3D RECONSTRUCTION OF INSECT BEHAVIOR

(71) Applicant: Tsinghua University, Beijing (CN)

(72) Inventors: Yuantao Gu, Beijing (CN); Xiangqian Che, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 15/811,214

(22) Filed: Nov. 13, 2017

(65) Prior Publication Data

US 2018/0225518 A1    Aug. 9, 2018

(30) Foreign Application Priority Data

Feb. 8, 2017    (CN) .......................... 2017 1 0068960

(51) Int. Cl.
*G06K 9/00* (2006.01)
*G06K 9/62* (2006.01)
(Continued)

(52) U.S. Cl.
CPC ..... *G06K 9/00718* (2013.01); *G06K 9/00362* (2013.01); *G06K 9/4633* (2013.01);
(Continued)

(58) Field of Classification Search
CPC ........... G06K 9/00362; G06K 9/00718; G06K 9/4633; G06K 9/6223; G06K 9/6247;
(Continued)

(56) References Cited

U.S. PATENT DOCUMENTS 7,269,516 B2 *  9/2007  Brunner ................. A01K 1/031
                                                              702/19
7,496,228 B2 *  2/2009  Landwehr ............. A01M 1/026
                                                              382/165
(Continued)

OTHER PUBLICATIONS

Dankert et al., Automated monitoring and analysis of social behavior in Drosophila, Nature Methods, vol. 6 No. 4; Apr. 2009 pp. 297-303.
(Continued)

*Primary Examiner* — Bhavesh M Mehta
*Assistant Examiner* — Ian L Lemieux
(74) *Attorney, Agent, or Firm* — Blank Rome LLP

(57) ABSTRACT

The present disclosure relates to video analysis. An apparatus includes: a foreground extracting section, for extracting an insect foreground image from an input video; and a 3D posture reconstruction section, including a feature point solving unit for calculating initial feature points in the insect foreground image and using calibrated feature points in the insect foreground image to generate a feature point signal subspace, training an iteration matrix based on the initial feature points and the calibrated feature points under the constraints of the feature point signal subspace, so as to limit the iteration matrix in the feature point signal subspace, and solving ultimate feature points of an insect body in each video frame by iterating the initial feature points with the trained iteration matrix, and a posture calculating unit that reconstructs a posture of the insect by the ultimate feature points of the insect body. The embodiment of the present disclosure may self-adapt the iteration process for the 3D features of the insect, which helps to improve robustness of reconstructing the insect's 3D posture.

23 Claims, 9 Drawing Sheets

(51) Int. Cl.
*G06K 9/46* (2006.01)
*G06T 7/73* (2017.01)

(52) U.S. Cl.
CPC ......... *G06K 9/6223* (2013.01); *G06K 9/6247* (2013.01); *G06K 9/6267* (2013.01); *G06K 9/6269* (2013.01); *G06T 7/73* (2017.01); *G06T 2207/10016* (2013.01); *G06T 2207/10024* (2013.01); *G06T 2207/20081* (2013.01)

(58) Field of Classification Search
CPC ................ G06K 9/6267; G06K 9/6269; G06T 2207/10016; G06T 2207/10024; G06T 2207/20081; G06T 7/73
See application file for complete search history.

(56) References Cited

U.S. PATENT DOCUMENTS

| | | | |
|---|---|---|---|
| 7,848,888 B2 | 12/2010 | Faeldt et al. | |
| 8,570,376 B1* | 10/2013 | Sharma | H04N 7/18 348/159 |
| 8,755,571 B2* | 6/2014 | Tsai | G06K 9/00 382/110 |
| 9,864,951 B1* | 1/2018 | Makhijani | G06F 17/276 |
| 2004/0076318 A1 | 4/2004 | Faeldt et al. | |
| 2004/0076999 A1 | 4/2004 | Faeldt et al. | |
| 2007/0297676 A1* | 12/2007 | Matsuyama | G06F 19/22 382/190 |
| 2009/0202108 A1 | 8/2009 | Faeldt et al. | |
| 2017/0213359 A1* | 7/2017 | Zhou | G06T 7/73 |
| 2018/0121764 A1* | 5/2018 | Zha | G05B 13/027 |

OTHER PUBLICATIONS

Branson et al., "High-throughtput ethomics in large groups of *Drosophia*", Nature Methods, vol. 6 No. 6, Jun. 2009, pp. 451-457.
Kabra, et al. "JAABA: interactive machine learning for automatic annotation of animal behavior", Nature Methods, vol. 10 No. 1; Jan. 2013, pp. 64-67.
JAABA; Nature Methods doi:10/1038/nmeth.2281.
Hoyer, et al. "Octopamine in Male Aggression of *Drosophila*", Current Biology vol. 18: No. 3, pp. 159-167, Feb. 12, 2008.
Dankert, et al. "Automated monitoring and analysis of social behavior of *Drosophila*", Nature Methods: doi:10.1038/nmeth. 1310.
Branson, et al. "high-throughput ethomics in large groups of *Drosophila*" Nature Methods: doi:10.1038/nmeth.1328.
Hoyer, et al. "Octopamine in Male Aggression of *Drosophila*".
Xiang, "Study on Drosophila Recognition Algorithm in Controlled Environment of Low Costs", 1006-9348 (2016), pp. 199-205.
Cootes et al., "Active Appearance Models", IEEE Transactions on Pattern Analysis and Machine Intelligence, vol. 23, No. 6, Jun. 2001, pp. 681-685.

* cited by examiner

VIDEO ANALYSIS FOR 3D RECONSTRUCTION OF INSECT BEHAVIOR

RELATED APPLICATION

This application claims the priority benefit of Chinese Patent Application No. 2017-10068960.5, filed on Feb. 8, 2017, in the Chinese Intellectual Property office, the disclosure of which is incorporated herein by reference.

TECHNICAL FIELD

The present disclosure relates to the field of video analysis, in particular, relates to automatic identification of features of insects via video analysis.

RELATED ART

Animal behavior is an important research direction in biology. Conventional animal behavior research mainly relies on manual identification and analysis of the intensity of animal behavior, which not only costs manpower and time, but also reduces the comparability between different experiments due to inconsistent subjective standard of different people toward behaviors. By far, there have been some algorithms for automatic analysis of insect behavior videos. However, the existing algorithms, though applicable to relatively ideal video recording environment, are found difficult to cope with the video noise under a low-cost recording condition such as a biology laboratory with low robustness. In addition, the existing algorithms bring a huge amount of calculation to the electronic apparatus such as a computer during the video analysis, thereby affecting the performance of the electronic apparatus.

SUMMARY

In view of the above, the present disclosure provides an apparatus, a method and a computer program product for video analysis.

According to one aspect of the present disclosure, there is provided a video analysis apparatus. The apparatus comprises: a foreground extracting section, for extracting an insect foreground image from an input video; and a 3D (three-dimensional) posture reconstruction section, including: a feature point solving unit, for calculating initial feature points from the insect foreground image and using calibrated feature points in the insect foreground image to generate a feature point signal subspace, training an iteration matrix under the constraints of the feature point signal subspace according to the initial feature points and the calibrated feature points, so as to limit the iteration matrix in the feature point signal subspace, and by iterating the initial feature points with the trained iteration matrix, solving insect body ultimate feature points in each video frame, and a posture calculating unit that reconstructs a posture of the insect by the insect body ultimate feature points.

According to another aspect of the present disclosure, there is provided a video analysis method. The method comprises: extracting an insect foreground image from an input video; calculating initial feature points from the insect foreground image, and using calibrated feature points in the insect foreground image to generate a feature point signal subspace; according to the initial feature points and the calibrated feature points, training an iteration matrix under the constraints of the feature point signal subspace, so as to limit the iteration matrix in the feature point signal subspace; by iterating the initial feature points with the trained iteration matrix, solving insect body ultimate feature points in each video frame; and by the insect body ultimate feature points, reconstructing a posture of the insect.

According to another aspect of the present disclosure, there is provided a video analysis apparatus. The video analysis apparatus comprises a processor and a memory for storing processor executable instructions, wherein the processor is configured to execute the video analysis method according to any of the above possible embodiments.

According to another aspect of the present disclosure, there is provided a computer program product. The computer program product includes computer-readable program instructions for enabling the processor to perform the video analysis method according to any of the above possible embodiments.

The embodiments of the present disclosure may self-adapt the iteration process for the 3D features of the insect, which helps to improve robustness of the insect 3D posture reconstruction.

Further, according to the embodiments of the present disclosure, for example, limiting the area of foreground in the video with the insect body structure, and self-adapting the threshold value of 3D features of the insect, helps to improve robustness and/or accuracy of insect 3D posture reconstruction. During the video analysis, the amount of calculation for the electronic apparatus such as a computer is significantly reduced, thereby improving the performance of the electronic apparatus such as a computer, for example, enhancing the speed of processing and result returning of the computer.

Additional features and aspects of the present disclosure will become apparent from the following description of exemplary examples with reference to the attached drawings.

BRIEF DESCRIPTION OF THE DRAWINGS

The drawings, which are incorporated in and constitute part of the specification, together with the description, illustrate exemplary examples, features and aspects of the present disclosure and serve to explain the principles of the present disclosure.

DETAILED DESCRIPTION

Figure 1:
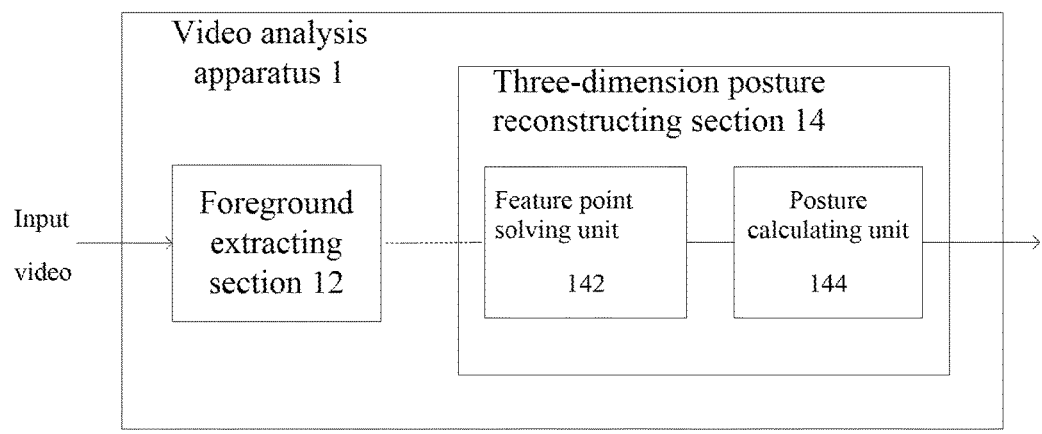
FIG. 1 is a block diagram showing a video analysis apparatus t according to an exemplary embodiment for automatically identifying insect features from the input video.

Various exemplary examples, features and aspects of the present disclosure will be described in detail with reference to the drawings. The same reference numerals in the drawings represent parts having the same or similar functions. Although various aspects of the examples are shown in the drawings, it is unnecessary to proportionally draw the drawings unless otherwise specified.

Herein the term "exemplary" means "used as an instance or example, or explanatory". An "exemplary" example given here is not necessarily construed as being superior to or better than other examples. In some implementations, the term "threshold value" mentioned the present disclosure can be understood as a threshold value of the brightness in the sub-videos.

Numerous details are given in the following examples for the purpose of better explaining the present disclosure. It should be understood by a person skilled in the art that the present disclosure can still be realized even without some of those details. In some of the examples, methods, means, units and circuits that are well known to a person skilled in the art are not described in detail so that the principle of the present disclosure become apparent.

FIG. 1 is a block diagram showing a video analysis apparatus 1 according to an exemplary embodiment for automatically identifying insect features from the input video. The apparatus can be used for automatically identifying insect features from an input video. As shown in FIG. 1, the video analysis apparatus 1 may include the foreground extracting section 12 and the 3D posture reconstruction section 14. The foreground extracting section 12 is capable of extracting an insect foreground image from the input video. The 3D posture reconstruction section 14 may include a feature point solving unit 142 and a posture calculating unit 144. The feature point solving unit 142 may calculate initial feature points from the insect foreground image and use the calibrated feature points in the insect foreground image to generate a feature point signal subspace. The feature point solving unit 142 may also, according to the initial feature points and the calibrated feature points, train an iteration matrix under the constraints of the signal subspace, so as to limit the iteration matrix in the feature point signal subspace, and by performing iteration on the initial feature points with the trained iteration matrix, solve the insect body ultimate feature points in each video frame. The posture calculating unit 144 may reconstruct the insect posture with the insect body ultimate feature points as solved. In one specific implementation, the foreground extracting section 12 may use an insect arena (or "fighting arena") model to perform the iteration so as to self-adaptively calculate the foreground in the input video, and thereby extract the insect foreground image.

Figure 2:
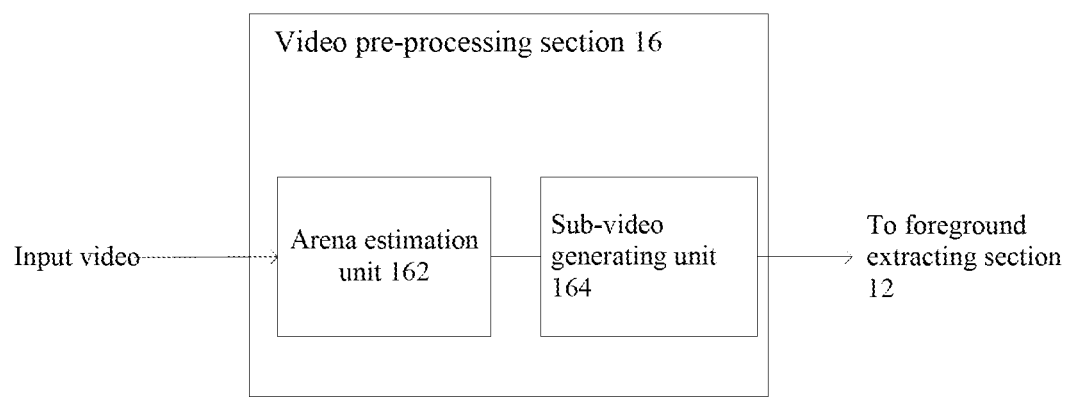
FIG. 2 is a block diagram showing a video pre-processing section 16 according to one example.

In one example, the video analysis apparatus 1 may further comprise a video pre-processing section 16. FIG. 2 is a block diagram showing a video pre-processing section 16 according to one example. The video pre-processing section 16 is used for performing a pre-processing on the input video to obtain multiple sub-videos. The video pre-processing section 16 may include an arena estimation unit 162 and a sub-video generating unit 164. As illustrated by FIG. 2, the arena estimation unit 162 may extract multiple frames from the input video, and estimate the position and the dimension of each insect arena and the time for the insect arena appearing and being removed out of the multiple frames. In a specific implementation, the arena estimation unit 162 may apply to the multiple input frames mathematical transform corresponding to the known shapes of the multiple insect arenas, so as to detect objects corresponding to the known shapes in the multiple frames. According to the position and the dimension of each insect frame and the time of the insect frame appearing in the multiple frames as estimated by the arena estimation unit 162, the sub-video generating unit 164 may segment the input video to obtain multiple sub-videos each containing a single insect arena. The foreground extracting section 12 illustrated by FIG. 1 can extract the insect foreground image according to the normalized multiple sub-videos. It should be understood that the arena estimation unit 162 may be used, but not limited thereto, to detect a circular arena in the video. For example, it may also be used to detect a plurality of arena having other shapes. When an arena having a different shape is detected, merely the transform needs to be replaced by a mathematical transform such as Hough transform for detecting other special shapes. By various modifications adaptive to the above mathematical transforms, detection for an arena of any shape can be performed. One skilled in the art can easily understand that the above various modifications are all included in the scope of this disclosure.

Background Model

In one specific example, the pixel value of the video background may be modeled into a certain probability distribution to obtain the foreground pixels that do not belong to the background model. On this basis, the precise foreground may be obtained through a self-adaptive algorithm. In a specific implementation, the test video used after being segmented by for example the sub-video generating unit 164 may merely include a single fixed arena. Thus, the video background may be modeled using for example, a single Gaussian background model. In particular, according to one example, the video analysis apparatus 1 may first model the value of each pixel in the video into a single Gaussian distribution, and then obtain the Gaussian distribution mean value and mean variance of the pixel (x, y) as the distribution parameters of the background model with respect to the whole video.

In one example, the insect arena model may be the circle center and the radius of the arena cavity in the input video, which describes the movable range of the insect in the arena. The object insect may be constrained to act within the insect arena. In one example, when the insect in the insect arena moves rather frequently and the area encompassed by its movement covers the whole arena cavity, variations in the parameters of the background model may be used for modeling the arena. In an example, the root mean square of the initial brightness distortion of each pixel in the input video varies significantly inside and outside the arena cavity, and thus can be used to determine the range of the arena cavity. The algorithm process is illustrated as the following algorithm. It should be understood that, though the pseudo code of the following algorithm uses a fruit fly as an example of the object insect, the apparatus and the method of the present disclosure may be applied to video analysis of other insects and are not limited to fruit fly. In the following instance of the algorithm, N is the number of connected domains in the binary image of RMS of brightness distortion, and M the number of connected domains among the above connected domains which are not close to the edge.

```
Input:
        Root mean square RMS( a ) of the initial brightness distortion in the video ;
Output:
        Circle center of the arena cavity $\vec{o}_{arena} = (o_{arena,x}, o_{arena,y})$;
        Inner radius of the arena cavity $r_{arena}$;
 1:  binarize RMS( a ) with the mean value of RMS( a ) as the threshold value, and obtain a
binary image $I_{BW,o}$;
 2:  solve each connected domain $C'_1, ..., C'_N$ in $I_{BW,o}$ (See, Bradski G, Kaehler A.
Learning OpenCV: Computer vision with the OpenCV library. O'Reilly Media, Inc., 2008);
 3:  remove from $C'_1, ... C'_N$ the connected domains adjoining the edge of $I_{BW,o}$, and obtain
$C_1, ... C_M$;
 4:  solve the area $S_1, ..., S_M$ of $C1, ... C_M$;
 5:  $S_{max} = \max_i S_i$, $C^{(0)} = \emptyset$
 6:  for i = 1 to M do
 7:       if $S_i \geq \xi S_{max}$ then
 8:            $C^{(i)} = C^{(i-1)} \cup C_i$;
 9:       else
10:            $C^{(i)} = C^{(i-1)}$;
11:       end if
12:  end for
13:  solve the circle center $\vec{o}_{arena} = (o_{arena,x}, o_{arena,y})$ and the inner radius $r_{arena}$ of the
circumscribed circle of $C^{(M)}$;
14:  Output $\vec{o}_{arena}$ and $r_{arena}$.
```

Figure 3:
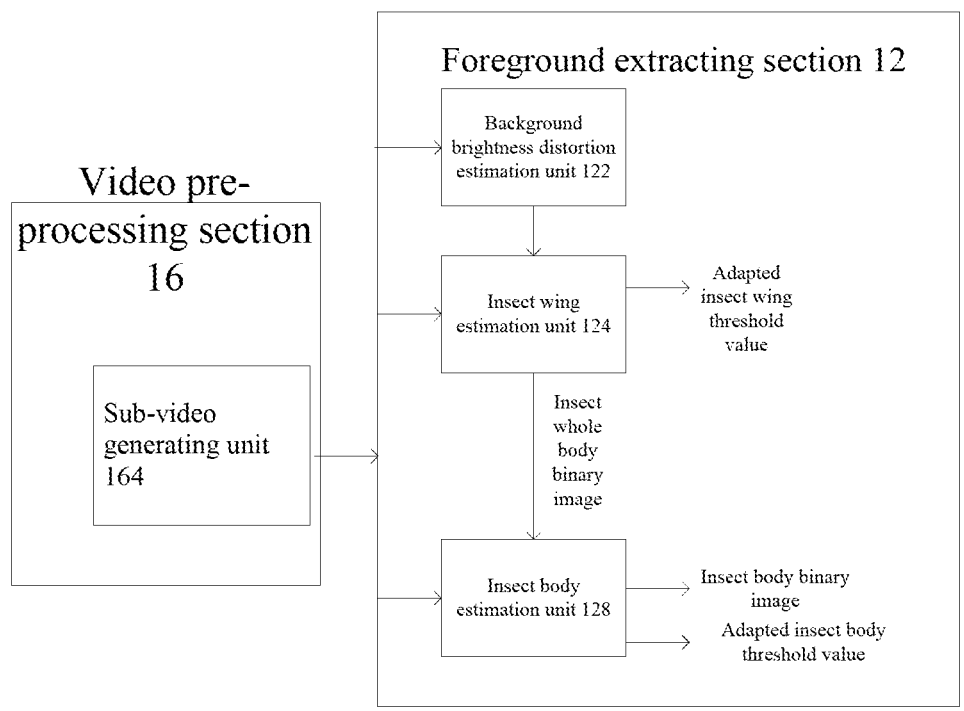
FIG. 3 is a block diagram showing a foreground extracting section 12 according to one example.

FIG. 3 is a block diagram showing a foreground extracting section 12 according to one example.

As shown in FIG. 3, in an example, the foreground extracting section 12 may include a background brightness distortion estimation unit 122, an insect wing estimation unit 124, an insect body estimation unit 128, and in certain implementations an insect's average dimension estimation unit 126. The background brightness distortion estimation unit 122 may be used for dividing the background into sub-videos. The insect wing estimation unit 124 is used to obtain an insect whole body binary image according to the sub-videos and the initial insect wing threshold value. Iteration may be performed with regard to each frame of the multiple frames, and in the iteration, the initial insect wing threshold value undergoes self-adaptive adjustment according to an area of the connected domains in the insect whole body binary image. The insect wing estimation unit 124 may output the insect whole body binary image and the self-adapted insect wing threshold value. The insect body estimation unit 128 may receive the sub-videos and the insect whole body binary image, and receive an initial insect body threshold value and the known number of insects in the sub-videos. The insect body estimation unit 128 may use the initial insect body threshold value to solve the body binary image, wherein iteration is performed with regard to each frame of the multiple frames. In the iteration, the initial insect body threshold value undergoes self-adaptive adjustment according to an area of the connected domains in the body binary image, so as to output the self-adapted insect body threshold value and the insect body binary image obtained according to the self-adapted insect body threshold value. In one example, the insect foreground image may include the insect body binary image obtained with the self-adapted insect body threshold value. The exemplary embodiment may help coping with the influence of illumination variation in a short period on video analysis.

In one specific implementation, the average body area of the insects in the video may be obtained by the insect's average dimension. By limiting an area of the body and the wings as detected in the foreground image according to the average body area, a reasonable foreground threshold value can be obtained self-adaptively. Apart from optimizing the foreground extraction, the arena model and the insect model may also support to establish insect postures and be used for normalization of the insect features.

In one specific example, the fruit fly is used as the object insect. For example, the background brightness distortion estimation unit 122 in the video analysis apparatus 1 may use a pixel layer model to preliminarily divide the pixel points into those belonging to the background, the fruit fly body, and the fruit fly wings respectively. For example, the arena model, the fruit fly body model and the fruit fly wing model (collectively referred to as the object layer model) may be used to more precisely estimate the position and the dimension of the fruit fly body and wings, wherein the parameters such as threshold values characterizing the arena, the body, the wing or the like can be acquired through iteration calculation with self-adaptive algorithms.

In one specific example, after a video model is obtained, the body threshold value and the wing threshold value of the insect can be self-adaptively adjusted according to the video model. The insect body in the foreground image may determine the features including the position, the orientation and the body inclining angle of the insect, while the wing may determine the insect wing angle. In one specific example, in the foreground image, the insect body may be of more importance than the wings.

For example, in one specific implementation, firstly the insect wing threshold value may be self-adapted to obtain a relatively accurate wing area. For example, the insect body threshold value can be self-adapted with the combination of the insect model and the result of self-adapting the insect wings, so as to obtain a more precise insect body. For a further example, the insect wings in the foreground image may be optimized according to the result of self-adapting the insect body, so as to obtain a more precise foreground image. In one specific example, the noise caused by the fixed threshold may be eliminated according to the statistical value of the insect body dimension, so as to obtain a relatively accurate insect model.

In one specific implementation, for example, a desired fruit fly body area and wings area in the foreground may be determined according to a fruit fly model, so that the threshold value can be self-adapted according to the current foreground area, so as to improve the robustness of the foreground extraction.

In one specific implementation, for example, for the fruit flies in the video, the foreground pixels of the video may be divided into two parts, i.e., the body and the wings. Since the body of the fruit fly is usually black, the division may be performed according to the variation in the pixel brightness for example. On the other hand, the wings of the fruit fly wing allow certain light transmittance, which may cause the pixel values to have the same color tone with the background yet the brightness different from the background, exhibiting characteristics similar to a shadow Therefore, in an exemplary implementation, brightness distortion as proposed by Horprasert et al. (Horprasert T., Harwood D., Davis L. S., A robust background subtraction and shadow detection. Proc. ACCV, 2000. 983-988) may be used to depict the brightness variation among the background pixels, so as to distinguish the body from the wings of the fruit flies.

Since different pixels may have different range of variation, in order to adopt a unified threshold value to deal with all of the pixels, the background brightness distortion estimation unit 122 may normalize each of the pixel values in the video with a mean-removed root mean square (RMS) to obtain the ultimate brightness distortion.

In one specific example, in the above iteration calculation of the foreground extracting section 12, the insect's average dimension estimation unit 126 may be used to obtain a body binary image according to the sub-videos and the initial insect body threshold value, and modeling, corresponding to the known number of insects in the arena, the insect body in the body binary image, so as to solve the insect's average dimension. When the number of connected domains of the insect body in the sub-videos is different from the number of the insects, the insect's average dimension estimation unit 126 may cluster the coordinates of each pixel in the sub-video to solve the insect's average dimension. For example, according to the insect's average dimension, the insect's average dimension estimation unit 126 may further solve the average body area of the insects. The insect's average dimension estimation unit 126 may also limit the insect body and wing area detected in the insect foreground image according to the average body area, so as to self-adaptively adjust the insect wing threshold value and the insect body threshold value.

In one specific example, the insect wing estimation unit 124 may determine a minimal area value for the insect whole body and a maximal area value for the insect whole body correspondingly to the possible postures of the insects, and the product of the average body area and the number of insects in the sub-videos. For example, in the iteration calculation, a comparison can be conducted between the sum of the area of each connected domain in the insect whole body binary image and the maximal area value of the insect whole body. If the sum of the area of each connected domain in the insect whole body binary image is larger than the insect whole body maximal area value, the insect wing threshold value can be reduced by a predetermined step-size for self-adapting; if the sum of the area of each connected domain in the insect whole body binary image is smaller than the insect whole body maximal area value, the insect wing threshold value can be increased by the predetermined step size for self-adapting (also referred to as "self-adapting step-size"), thereby obtaining the sell-adapted insect wing threshold value.

For example, in one specific implementation, the maximal times of self-adaption performed in the iteration calculation and the predetermined self-adapting step-size may be determined according to the frame rate or the illumination variation conditions of the sub-videos.

In one specific example, the method for self-adapting the fruit fly wing threshold value by for example the insect wing estimation unit 124 is explained by the following algorithm.

Input:
    Video frame I containing a single fighting arena;
    Initial threshold value $\tau_2^{(0)}$ for the wing of the fruit fly;
Output:
    Fruit fly whole body binary image $F_{fly}$;
    Self-adapted fruit fly wing threshold value $\tau_2$;
1:    for i = 0 to $i_{max,fly}$ − 1 do
2:        use $\tau 2^{(i)}$ to solve $F_{fly}^{(i)}$ of I;
3:        solve the area $S_1, ..., S_N$ of each connected domain in $F_{fly}^{(i)}$;
4:        $S_{fly} = \Sigma_{S_n > S_{noise}} S_n$;
5:        if $S_{fly} > S_{max,fly}$ then
6:            $\tau_2^{(i+1)} = \tau_2^{(i)} - \Delta\tau_2$;
7:        else if $S_{fly} < S_{min,fly}$ then
8:            $\tau_2^{(i+1)} = \tau_2^{(i)} + \Delta\tau_2$;
9:        else
10:           break:
11:       end if
12:   end for
13:   $^{output}\tau_2 = \tau_2^{(i)}$ 和 $F_{fly} = F_{fly,a}^{(i)}$ The above example of the algorithm includes 5 parameters, namely, the maximal number of self-adaption $i_{max,fly}$, the noise threshold value $S_{noise}$, the self-adapting step-size d, and the fruit fly area constraints $S_{min,fly}$ and $S_{max,fly}$. In one example, $S_{min,fly}$ can be the insect whole body minimal area value, and $S_{max,fly}$ the insect whole body maximal area value, wherein $i_{max,fly}$ may be used to limit the times of self-adaption, as a precaution for extremely difficult conditions in the video. $F_{fly}$ indicates the insect whole body binary image. $S_{noise}$ may be used for noise reduction for the connected domains of $F_{fly}$, with its value being reasonably selected according to the signal-noise ratio of the video. The self-adapting step-size Δ may be used to control the fineness of each time of the self-adaption, and together with $i_{max,fly}$ may determine the maximal self-adaption speed. Δ and $i_{max,fly}$ may be reasonably selected according to factors including the FPS (Frames Per Second) and illumination variation conditions of the video.

$S_{min,fly}$ and $S_{max,fly}$ are parameters for self-adaptive adjustment. They may be used to determine the area of the fruit fly body and wings in the foreground after the self-adaption. Under an ideal condition, $S_{fly}$ may merely include the body and the wings of the fruit fly, and thereby determining the reasonable $S_{min,fly}$ and $S_{max,fly}$ according to the body structure of the fruit fly and the number of fruit flies in the video.

In one specific example, in the iteration, when the sum of the area of each body connected domain in the insect body binary image is larger than the insect body maximal area value, the insect body estimation unit 128 may reduce the insect body threshold value by the predetermined self-adapting step-size. In a specific implementation, when the sum of the area of each body connected domain is smaller than the insect body minimal area value, the insect body threshold value may be increased by the predetermined self-adapting step-size. In a specific implementation, the insect body maximal area value and the insect body minimal area value may be determined corresponding to the average body area and the possible posture of the insect.

In a specific example, the insect body estimation unit 128 may also increase the insect body threshold value by the predetermined self-adapting step-size under the following conditions: for example, the number of the insect body connected domains is detected to be larger than the number of insects in the sub-video, and meanwhile there is an insect whole body connected domain that has two or more insect body connected domains inside the insect whole body connected domain. The exemplary embodiment may help coping with the situation that the initial insect body threshold value is set low, causing the insect body connected domain to split up.

For example, similar to the method for self-adapting the wing threshold value, the self-adaption may be performed by the insect body estimation unit 128 according to the area of the connected domains. The process of the algorithm is substantially the same with the above algorithm for self-adapting the fruit fly wing threshold value, with the meanings of the parameters corresponding to the parameters in the above algorithm. The following merely describes the difference between the two algorithms.

In the self-adapting algorithm for the insect body estimation, apart from limiting the minimal area of the fruit fly body, additional conditions may be added. For example, in order to avoid missing in detection when the insect is in a different posture, if the object insect is for example a fruit fly, $S_{min,body}$ may be complemented by the affiliation between the fruit fly body connected domains and the fruit fly whole body connected domains. Tests demonstrate that when the initial insect body threshold value is relatively low, the connected domains of the body may split up, in which case the conditions to be added are the following two for example:

1. The detected number of the fruit fly body connected domains is larger than the number of the fruit flies in the video, i.e., M>K; and
2. There is a fruit fly whole body connected domain, in which the number of the fruit fly body connected domain is two or more.

In one specific implementation, after the self-adapted insect body threshold value and the insect body binary image $F_{body}$ are obtained, $F_{fly}$ may undergo a second-time noise reduction. For example, a more precise video foreground may be obtained by removing from $F_{fly}$ the connected domains that do not include the fruit fly body. When a foreground threshold value self-adaption algorithm based on the video model is introduced, for example, when an illumination variation occurs in a short period in the video which causes a wrong foreground determination, the insect body threshold value and the insect wing threshold value may be adjusted correspondingly according to the self-adaption conditions, so as to obtain a more precise foreground binary image, i.e., the insect wing binary image $F_{fly}$ and the insect body binary image $F_{body}$.

Figure 4:
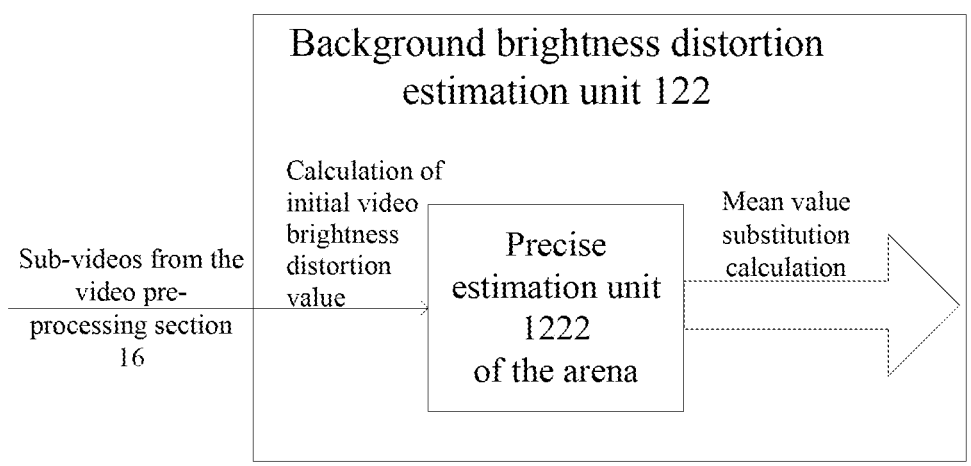
FIG. 4 is a block diagram showing a structure of a background brightness distortion estimation unit according to a specific example.

FIG. 4 is a block diagram showing a structure of a background brightness distortion estimation unit according to a specific example. In a specific example, as shown in FIG. 4, the background brightness distortion estimation unit 122 may include a precise estimation unit 1222. In one exemplary implementation, the precise estimation unit 1222 may receive the sub-videos from the video pre-processing section 16, binarize the sub-videos with the initial video brightness distortion value as a threshold value, and solve each connected domain in the obtained arena binary image. For example, the precise estimation unit 1222 may select a connected domain larger than a particular threshold as the cavity range of the arena, and solve the exact position and dimension of the arena with regard to the selected cavity range. In one specific example, the background brightness distortion estimation unit 122 may also use the position and the dimension solved by the precise estimation unit 1222 to substitute the statistical value of each pixel within the arena cavity with a mean value of all pixels outside the arena cavity, so as to determine the background.

In one specific example, the feature point solving unit 142 may estimate the insect posture according to the insect foreground image extracted by the foreground extracting section 12, wherein the feature point solving unit 142 may use the body binary image obtained by for example the insect body estimation unit 128 to estimate the insect basic body features. In one specific implementation, the feature point solving unit 142 may calculate the insect body initial feature points, according to the basic body features obtained by the insect body estimation unit 128 and the position, orientation or inclining angle of the insects. Then, in one specific implementation, the feature point solving unit 142 may also estimate the insect wing initial feature points according to the insect whole body binary image obtained by for example the insect wing estimation unit 124.

In one specific implementation, the feature point solving unit 142 may use the insect arena model to solve the relative radius of the insect in the arena and the relative orientation of the head of the insect, so as to estimate the posture of the insect.

Further, for example, the feature point solving unit 142 may align the calibrated feature point set and the corresponding initial feature point set based on the head orientation of the initial feature points, and train the iteration matrix with the Supervised Descent Method, i.e., SDM algorithm, so as to obtain the insect body ultimate feature points.

Calibration of Feature Points

In one specific implementation, the fruit fly is taken as an example of the object insect. For example, after the positions of the fruit fly feature points are defined, the fruit fly feature points can be calibrated, so as to train the feature point positioning model.

Introduction of SDM Algorithm with Subspace Constraints

As compared with the issues of feature point positioning involving human face and the like, the insect feature points are less, and when the insect inclines and spins, the positions of the feature points in the image are not explicit. As a result, the SUM algorithm may easily arrive at a wrong result, affecting the reconstruction of the insect posture. Since the calibrated insect body feature points have certain symmetry, the correct feature point set can be considered as belonging to the same signal subspace. For example, referring to algorithms including AAM (Cootes T. F., Edwards G. J., Taylor C. J., Active appearance models. IEEE Transactions on Pattern Analysis & Machine Intelligence, 2001, (6); 681-685), the signal subspace is established with the calibrated points, with the iteration of the SDM algorithm being constrained to the signal subspace. Then the independent variables of the SDM algorithm turn into weights of various feature postures of the fruit fly in the signal subspace. For example, the insect posture may be updated directly via the features of the image, ensuring the acquirement of reconstructable feature points.

In one specific implementation, in order to reduce the dimension of the signal subspace, the insect feature points may be aligned. The following table illustrates the meaning and the symbolic representation of each exemplary feature point with a fruit fly as an example. One description of the feature point vector of the insect may be $\vec{p}=[\vec{p}_h\ \vec{p}_t\ \vec{p}_l\ \vec{p}_r\ \vec{p}_b\ \vec{p}_a\ \vec{p}_{lw}\ \vec{p}_{rw}]^T$. $\vec{p}$ may also be a different arrangement of the above feature points, wherein the feature points may include feature points in addition to the positions such as the insect head, the tail, the left side, the right side, the back, and the abdomen. First, the head $\vec{p}_h$ in all initial feature points of the insects could be rotated to the forward direction of x axis. Then, the calibrated points corresponding to each initial point and the brightness distortion images are rotated by an angle that is the same as that for the initial point. Finally, the origin point of the coordinates of all of the feature points could be translated to the body center $\vec{p}_c$. The feature point vector after the rotation and the translation is indicated by $\vec{p}$. In this case, it should be noted that, since the calculation of $\vec{p}_c$ does not involve the wing feature points, the overall center of the insect feature points is not located at the origin point of the coordinates. Referring to FIG. 5 again, the direction of the two ellipses shown in FIG. 5 may be determined according to the head-tail direction of the fruit fly. The center may be defined as for example:

$$\vec{p}_c = \frac{1}{6}(\vec{p}_h + \vec{p}_t + \vec{p}_l + \vec{p}_r + \vec{p}_b + \vec{p}_a)$$

$\vec{p}_c$ may also be defined as the mean of other parts of the fruit fly. For example, $\vec{p}_c$ may be defined as a weighed mean for the positions of the head, the tail, the left side, and the right side of the fruit fly, or a weighed mean for the positions of the head, the tail, the back, and the abdomen of the fruit fly, or any combination of other positions. To sum up, $\vec{p}_c$ may be defined as representing any estimation of the central position of the fruit fly.

| Feature point | Meaning | Sign |
|---|---|---|
| Head | End points of the long axis of | $\vec{p}_h$ |
| Tail | the insect body ellipse | $\vec{p}_t$ |
| Left side | End points of the short axis of | $\vec{p}_l$ |
| Right side | the insect body ellipse crossing the body horizontal plane | $\vec{p}_r$ |
| Back | End points of the short axis of | $\vec{p}_b$ |
| Abdomen | the insect body ellipse perpendicular to the body horizontal plane | $\vec{p}_a$ |
| Left wing | End points of the fruit fly | $\vec{p}_{lw}$ |
| Right wing | wings | $\vec{p}_{rw}$ |

In one specific example, Principal Components Analysis (PCA) may be used to establish the signal subspace for the fruit fly calibrated feature points, to obtain a projection $\vec{y}_0 = W(\hat{p} - \vec{\mu})$ of the fruit fly feature points on the subspace.

W stands for the projection matrix obtained by PCA, and $\vec{\mu}$ is the mean value of $\hat{p}$. The PCA may be substituted with another subspace dimension reduction algorithm, such as Linear Discriminant Analysis (LDA), Locally Linear Embedding (LLE), Isometric Mapping (Isomap) or Stacked Auto-Encoder (SAD).

After the projection vector $\vec{y}_0$ of the fruit fly feature points on the subspace and the center of the fruit fly are obtained, the independent variables of the SDM algorithm may be expressed as $\vec{y} = [\vec{p}_c^T \vec{y}_0]^T$.

Accordingly, the reconstruction method of $\vec{p}$ is obtained: $\vec{p} = [J\ W^T]\vec{y} + \vec{\mu} = g(\vec{y})$.

In this case, the iteration process of the SDM algorithm is $\vec{y}^{(k+1)} = \vec{y}^{(k)} + R^{(k)} h(g(\vec{y}^{(k)})) + \vec{b}^{(k)}$, wherein $R^{(k)}$ and $\vec{b}(k)$ are respectively the original iteration matrix and the offset of the SDM algorithm at the kth iteration, and $h(\cdot)$ represents solving the image features for the feature points. When there are multiple feature points, $h(\ )$ obtains a vector formed by connecting the image features of all the points.

In one specific implementation, the optimization function for the iteration training is $$\arg\min_{A^{(k)}} \|\Delta Y^{(k)} - A^{(k)} H^{(k)}\|_F^2 + \eta \|A^{(k)}\|_F^2$$

$\Delta \vec{y}_i^{(k)} = \vec{y}_i^* - \vec{y}_i^{(k)}$ is the difference in the signal subspace between the ith calibrated point and the iterated point of a corresponding initial point after k times of iteration, and $\|\cdot\|_F$ represents the Frobenius Norm. In one specific implementation, the feature point solving unit 142 may further calculate the angle of the insect's wings, according to the insect head direction and the initial position of the connecting point of the insect's wing with the body, so as to obtain insect wing initial feature points.

During the solution, let $$A^{(k)} = \begin{bmatrix} R^{(k)} & \vec{b}^{(k)} \end{bmatrix}$$

$$\Delta Y^{(k)} = \begin{bmatrix} \Delta \vec{y}_1^{(k)} & \cdots & \Delta \vec{y}_N^{(k)} \end{bmatrix}$$

$$H^{(k)} = \begin{bmatrix} h(g(\vec{y}_1^{(k)})) & \cdots & h(g(\vec{y}_N^{(k)})) \\ 1 & \cdots & 1 \end{bmatrix},$$

wherein N is the number of the calibrated points. The image feature $h(\cdot)$ of the points used in the SDM algorithm may be any image feature such as those of LBP, SIFT or HOG.

Thus, the iteration matrix $A^{(k)}$ of the SDM algorithm can be solved.

In one specific example, the posture calculating unit 144 may calculate the 3D coordinate of the wing connecting point, according to for example the insect body ultimate feature points obtained by the feature point solving unit 142. In a specific implementation, the posture calculating unit 144 may calculate the wing fluttering angle and the wing inclining angle with trigonometric functions according to the insect body model, so as to reconstruct the insect wing posture.

The following describes the reconstruction of the insect body and the wing posture in a specific example, taking the fruit fly as an example.

For example, the insect posture features taken into account may include at least one of the following: the insect body inclining angle, the angle between the body and the horizontal plane, the angle of the fruit fly spinning about a long axis of the body, the wing fluttering angle, the angle between the projection of the wings on the body horizontal plane and the fruit fly body, the wing inclining angle, and the angle between the fruit fly wing and the body horizontal plane.

For example, the inclining angle of the fruit fly body is positive when the fruit fly head is oriented upwards, and is negative otherwise. In order to determine the sign of the insect body inclining angle, the relative position of the feature point on a particular axis of the insect body could be considered.

Figure 5:
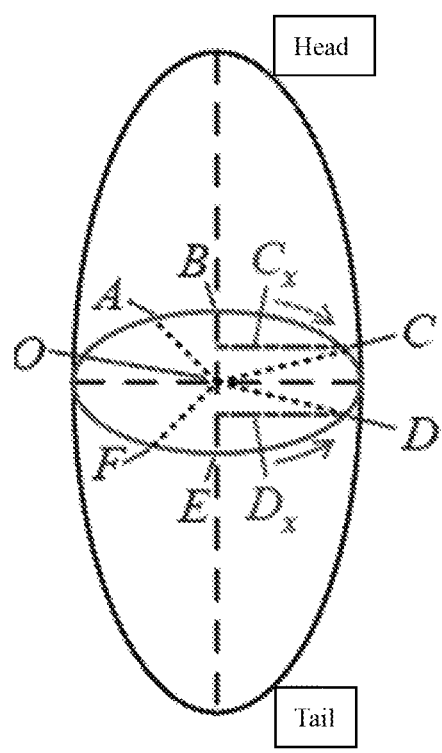
FIG. 5 is a diagram showing the insect body posture reconstruction according to one embodiment.

FIG. 5 is a diagram showing reconstruction of the insect body posture according to one embodiment.

For an elliptical insect body, a section passing the body center and crossed by the two short axes is circular, which is referred to hereinafter as the insect circular section. The insect circular section has an elliptical or segment projection in the video. When the projection is elliptical, it is as shown by the flat ellipse in the central part of FIG. 7, the dimension of which ellipse can be solved. When the sign of the insect body inclining angle is different, the right hand direction of the insect head orientation has a different spinning direction in the projection on the insect circular section. Therefore, this attribute can be used to determine the sign of the insect body inclining angle and the direction of the polar axis.

In a specific example, the posture calculating unit 144 may use the symmetry of the insect body to reduce the noise of the insect features.

Figure 6:
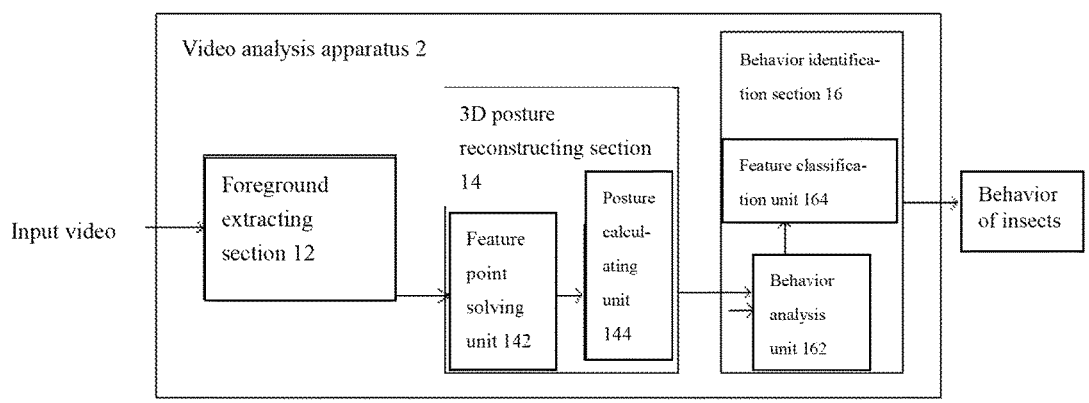
FIG. 6 is a block diagram showing a video analysis apparatus 2 according to one exemplary embodiment.

FIG. 6 is a block diagram showing a video analysis apparatus 2 according to one exemplary embodiment. As compared with the video analysis apparatus 1, the video analysis apparatus 2 may further comprise a behavior identification section 16. In a specific implementation, the behavior identification section 16 may further include a behavior analysis unit 162 and a feature classification unit 164. For example, the feature classification unit 164 may classify the insect features. After all classified features are obtained, the feature classification unit 164 may also whiten the training sample of the insect features, so that each feature has the same weight in the feature classification unit 164. For example, the behavior analysis unit 162 may receive the insect body ultimate feature points for example solved by the feature point solving unit 142, and may be used to train the feature classification unit 164 according to the features of the calibrated behaviors and the ultimate feature points, so as to analyze the insect behaviors. The exemplary embodiment may help improving the accuracy of the classification of animal behaviors.

In a specific example, the algorithm for the estimation of the insect body features may be for example, as shown in the following algorithm. Taking a fruit fly as an example, $\theta_h$ is the angle of $\vec{p}'_h - \vec{p}_c$ and can be obtained by simple calculation based on the fruit fly feature points, the angle of $\vec{0}$ is defined as 0. $\theta_{dip}$ stands for the fruit fly body inclining angle, i.e., the angle between the fruit fly body and the horizontal plane. Referring to FIG. 5 again, in the example of the ellipse shown by FIG. 5, $\bar{a}$ stands for the average length of the half long axis of the fruit fly, $\bar{b}$ the average length of the half short axis of the fruit fly, and hi the length of the long axis of the ellipse.

---

Input:
    Fruit fly body binary image $F_{body}$;
    Fruit fly average dimension $\bar{a}$ and $\bar{b}$;
    Number of flies in the video K;
    Fruit fly features $\vec{p}'_{c,i}$, $\theta'_{h,i}$ and $\theta'_{dip,i}$ of the previous frame in the video, i=1, ..., K;
Output:
    Fruit fly basic body features $\vec{p}_{c,i}^{(0)}$, $\theta_{k,i}^{(0)}$ and $\theta_{dip,i}^{(0)}$, i=1, ..., K;
  1: solve the number N of connected domains in $F_{body}$;
  2: while N<K do
  3:   initialize the segmentation algorithm with $\vec{p}'_{c,i}$, $\theta'_{h,i}$ and $\theta'_{dip,i}$;
  4:   segment the largest connected domain of $F_{body}$ with cell segmentation algorithm (See, Jung C, Kim C, Chae SW, et al. Unsupervised segmentation of overlapped nuclei using Bayesian classification. Biomedical Engineering, IEEE Transactions on, 2010, 57(12):2825-2832);
  5:   update the number N of connected domains;
  6: end while
  7: if N>K then
  8:   initialize the clustering center with $\vec{p}'_{c,i}$;
  9:   cluster the pixels with $F_{body}>0$ as K class based on the coordinates of the pixels, with K-means algorithm;
  10: end if
  11. let the body connected domains of K fruit flies be $C_1$, ..., $C_K$, respectively;
  12: for each connected domain $C_1$, ..., $C_K$, if they are obtained by segmentation, solve an ellipse corresponding to the profile equiprobability line of the connected domain; otherwise, solve the circumscribed rectangle of the connected domain, so as to obtain the center $\vec{p}_{c,i}^{(0)}$, the direction $\theta_i$ and the length $h_i$ of each connected domain;
  13:   rearrange the number of $\vec{p}_{c,i}^{(0)}$ according to $\vec{p}'_{c,i}$;
  14:   correct the direction of $\theta_i$ according to $\theta'_{h,i}$ to obtain $\theta_{k,i}^{(0)}$;
  15:   solve $\theta_{dip,i}^{(0)}$ according to $\bar{a}$ and $\bar{b}$ and $h_i$;
  16:   output $\vec{p}_{c,i}^{(0)}$, $\theta_{h,i}^{(0)}$ and $\theta_{dip,i}^{(0)}$.

---

In a specific example, the insect wing Feature can be roughly estimated features of the angle of the insect's 2D wings based on the insect wing binary image $F_{fly}$.

In a specific implementation, regarding the courtship ritual of the insect, the features for classification may additionally include the distance from the insect's head and the orientation of the insect's head to another insect.

In a specific implementation, during classification for continuous behavior of the insect, till more than half of the frames among the fixed number of input video frames are determined to belong to a same new class does the current class is switched to said new class. For example, since the courtship ritual of the fruit fly is a continuous behavior, noise burst can be reduced based on the continuity of each class.

Behavior Classification

In one embodiment, the input of the feature classification unit 164 may be classification features (features used for classifying) designed according to the features of insect's behavior. The classification feature can be divided into two parts, namely frame feature and Group of Pictures (GOP) feature. In the following description, fighting behavior is mentioned as an example. The frame feature is the single-frame classification feature. The GOP feature is the continuous-frame classification feature that cannot be obtained by a linear combination of the frame features in several successive frames. One example of GOP feature is shown in the following table.

| Features | Meaning | Signal | Normalization |
|---|---|---|---|
| Fruit fly position change | Distance between the central positions of the fruit fly body in the first and last frames of GOP | $\hat{v}_{GOP}$ | $r_{arena}$ |

-continued

| Features | Meaning | Signal | Normalization |
| --- | --- | --- | --- |
| Fruit fly direction change | Angle between the head orientations in the first and last frames of GOP | $\hat{\theta}_h$ | $\Delta\hat{\theta}_h$ |
| Head-center distance change | Amount of change in $\hat{d}_{hc}$ from the first to the last frame of GOP | | $\Delta\hat{d}_{hc}$ |

For example, the GOP length may be set to 3. In that case, the GOP of the tth frame refers to the frame set from (t−1)th frame to (t+1)th frame. In a specific implementation, the classification features of each frame may include the frame features of said frame and the frames before and following said frame, from which the inter-fame variation of the insect's information can be obtained. Further, the classification features also include the GOP features in a vicinity of the frame, from which the overall information in the vicinity of the frame can be obtained.

Though various behaviors may differ largely, the behaviors are substantially related to the features. Therefore, basic frame features for classifying that are common in different behaviors can be defined. In a specific implementation, normalization may be performed. For example, normalizing a column means normalizing with a corresponding video model after the length correlative is obtained, so as to eliminate the influence of the difference in dimension and individual differences among the arenas in different videos.

In a specific implementation, the basic frame feature for classifying either is equal to the original feature or can be obtained by simple calculation based on the feature of neighboring frames and the video model. The specific calculation process will not be further explained here.

With regard to the fighting behavior of insects, for example, there is a feature that the velocity direction changes in the process of falling backwards and dashing forward, and that during the fight, the head orientation is substantially toward one another. Thus, the additional frame feature of the fighting behavior may be defined accordingly. In one specific implementation, the ultimate fighting behavior frame features can include the additional frame feature and the basic frame feature.

After the classification features are obtained, the classification features of all the training samples can be whitened so that each feature has the same weight in the classifier.

The fighting behavior classifier can be trained according to the calibrated features and classification features of the fighting behaviors. Since the fighting behavior of insects has burstiness, the proportion of the positive sample frames in all the frames of the video may be very low. Therefore, in a specific implementation, all three frames of each fighting behavior may be taken as the positive sample, while the negative sample is obtained by for example evenly extracting several non-fighting frames from the video. Then, different class weights are applied to the SVM algorithm to avoid imbalance among the classes. In addition, during the training of the SVM classifier, for example, K-fold Cross-Validation may be applied to prevent overfilling. In the actual training, for example, K=5.

It should be understood that, though the fighting behavior is described herein as an example, the present disclosure is as well applicable for other behaviors such as the courtship ritual of insects.

Figure 7:
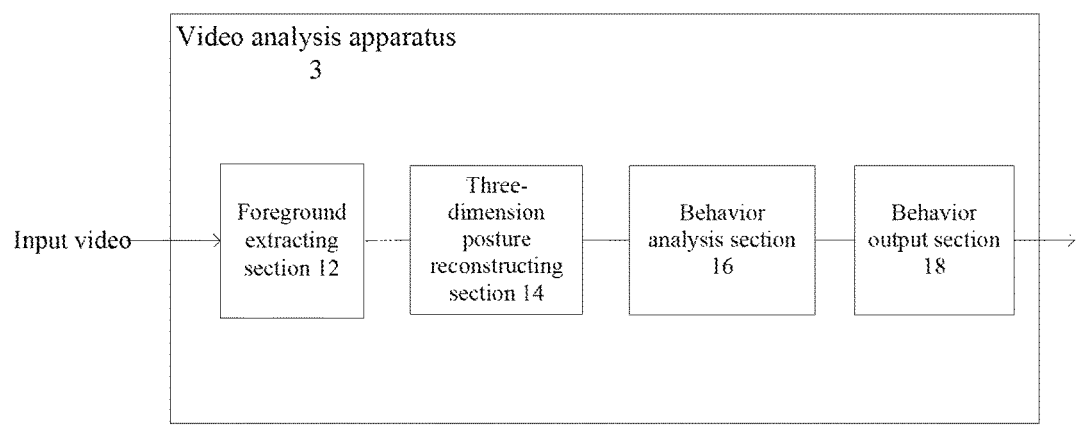
FIG. 7 is a block diagram showing a video analysis apparatus 3 according to one exemplary embodiment.

FIG. 7 is a block diagram showing a video analysis apparatus 3 according to one exemplary embodiment. As compared with the video analysis apparatus 1 and the video analysis apparatus 2, the video analysis apparatus 3 may further comprise a behavior output section 18. In a specific implementation, the behavior output section 18 may include a graphic user interface for outputting the behavior log.

Figure 8:
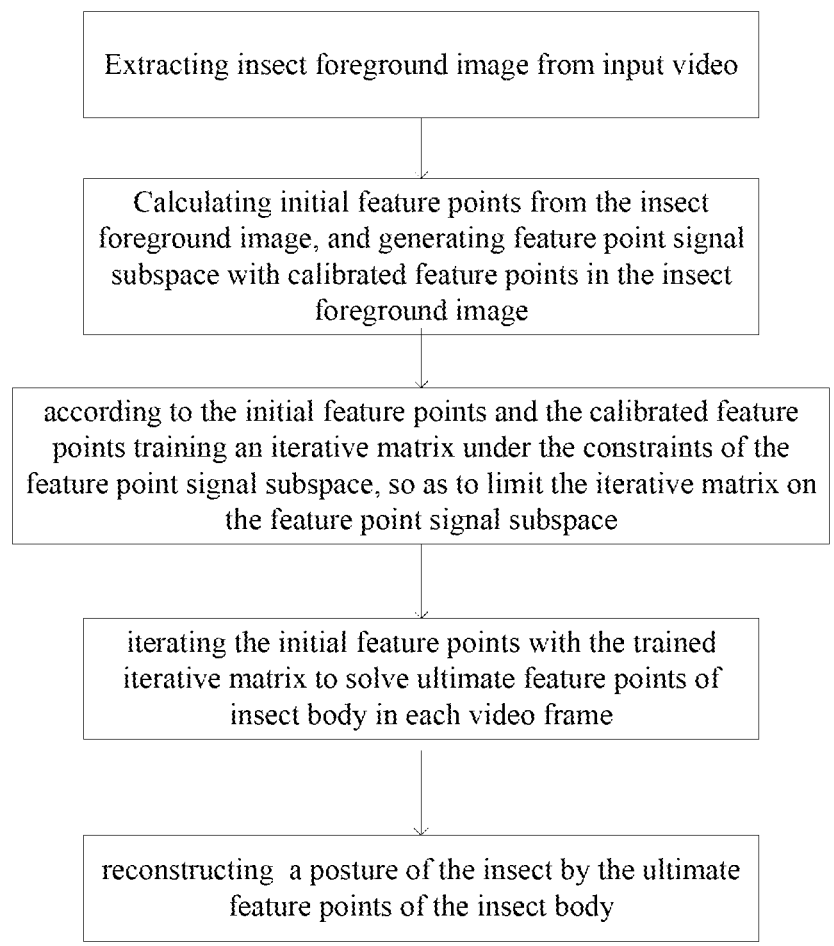
FIG. 8 is a flowchart of a video analysis method according to one exemplary embodiment.

FIG. 8 is a flowchart of a video analysis method according to one exemplary embodiment. The video analysis method may include the following steps: extracting the insect foreground image from the input video; calculating the initial feature points from the insect foreground image, and generating the feature point signal subspace with the calibrated feature points in the insect foreground image; according to the initial feature points and the calibrated feature points, training the iteration matrix under the constraint of the feature point signal subspace, so that the iteration matrix is limited in the feature point signal subspace; by performing iteration on the initial feature points with the trained iteration matrix, solving the insect body ultimate feature points in each video frame; and reconstructing the insect posture via the insect body ultimate feature points.

According to other possible embodiments, the video analysis method may comprise steps as mentioned above, which will not be repeated herein. It should be understood that the step sequence shown in FIG. 8 and the sequence of describing each step in other parts of this disclosure are merely exemplary. For example, the execution order of certain steps can be altered or some steps can be executed simultaneously, without departing from the scope and spirit of the present disclosure.

In a possible embodiment, the video analysis method may further include the following: extracting multiple frames from the input video, and estimating the position and the dimension of each insect arena in the multiple frames and the time when each insect arena appears and is removed; according to the estimated position and the dimension of each insect arena in the multiple frames and the time when each insect arena appears, segmenting the input video to obtain multiple sub-videos, each containing a single insect arena, wherein extracting the insect foreground image from the input video may include extracting the insect foreground image based on the normalized multiple sub-videos.

In a possible embodiment, extracting multiple frames from the input video may include: dividing the background of the sub-videos; according to the brightness distortion of the sub-videos and the initial insect wing threshold value, obtaining the insect whole body binary image, wherein iteration is performed on each frame of the multiple frames, during which, according to the area of the connected domain of the insect whole body binary image, self-adaptive adjustment is performed on the initial insect wing threshold value to output the insect whole body binary image and the self-adapted insect wing threshold value; receiving the insect whole body binary image, and receiving the sub-videos, the initial insect body threshold value, and the insect's known number in the sub-videos, wherein iteration is performed on each frame of the multiple frames, during which, according to the sub-videos, the initial insect body threshold value is used to solve the body binary image, and according to the dimension of the area of the connected domain in the body binary image, self-adaptive adjustment is performed on the initial insect body threshold value to output the self-adapted insect body threshold value, and the insect binary image obtained from the self-adapted insect body threshold value.

In a possible embodiment, extracting multiple frames from the input video may include: according to the brightness distortion of the sub-videos and the initial insect body threshold value, obtaining the body binary image; corresponding to the known number of the insect in the insect arena, modeling the insect body in the body binary image, so as to solve the insect's average dimension, wherein in the iteration, when the number the insect body connected domains in the sub-videos is different from the number of insects, clustering is performed on the coordinates of each pixel in the sub-videos to solve the insect's average dimension; according to the insect's average dimension, solving the average body area of the insects; and according to the insect's average dimension, limiting the area of the insect body and wings detected in the insect foreground image, so as to self-adaptively adjust the initial insect wing threshold value and the initial insect body threshold value.

In a possible embodiment, calculating the initial feature points from the insect foreground image may include: according to the insect foreground image extracted, estimating the posture of the insect; using the insect body binary image to estimate the basic body features of the insect; according to the basic body features, and the position, direction or inclining angle of the insect, calculating the insect body initial feature points; and according to the insect whole body binary image, estimating the insect wing initial feature points.

In a possible embodiment, reconstructing the insect posture via the insect body ultimate feature points may include: according to the insect body ultimate feature points, calculating the 3D coordinates of the wing connecting points; and according to the insect body model, calculating the wing fluttering angle and the wing inclining angle with trigonometric functions so as to reconstruct the insect wing posture.

In a possible embodiment, the video analysis method may further comprise: classifying the features of the insect, wherein the training samples of the features of the insect are whitened so that each feature has the same weight in the feature classification; and according to the calibrated behaviors and the solved insect body ultimate feature points, training the feature classification so as to analyze the behaviors of the insects.

In a possible embodiment, performing self-adaptive adjustment on the initial insect wing threshold value may include: increasing the insect body threshold value by a predetermined self-adaptive step-size under for example the following conditions: the number of the insect body connected domains as detected is larger than the number of the insects in the sub-videos, and meanwhile there is an insect whole body connected domain including therein two or more of the insect body connected domains.

In a possible embodiment, dividing the background in the sub-videos may include: using the initial video brightness distortion value as the threshold value to perform binarization on the sub-videos, and solving each connected domain in the obtained arena binary image; selecting a connected domain larger than a particular threshold as the cavity range of the insect arena; and with regard to the selected cavity range, solving the position and dimension of the insect arena.

Figure 9:
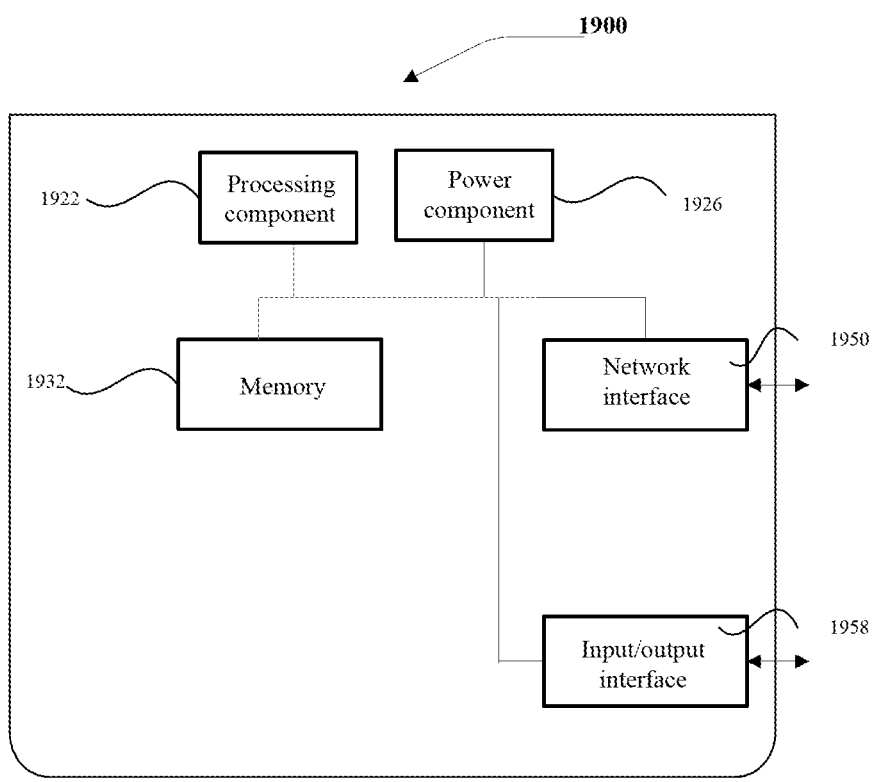
FIG. 9 is a block diagram showing a device 1900 for video analysis according to one exemplary embodiment.

FIG. 9 is a block diagram showing a device 1900 for video analysis according to one example of the exemplary embodiment. For example, the device 1900 may be provided as a server. Referring to FIG. 9, the device 1900 comprises a processing component 1922, and further comprises one or more processors, and memory resources represented by the memory 1932 for storing instructions such as application programs, which can be executed by the processing component 1922. The application programs stored in the memory 1932 may include one or more modules that each corresponds to a set of instructions. In addition, the processing component 1922 is configured to execute instructions, so as to execute the above video analysis method.

The device 1900 may further comprise a power component 1926 that is configured to execute power management for the device 1900, a wired or wireless network interface 1950 that is configured to connect the device 1900 to the network, and an input/output (I/O) interface 1958. The device 1900 is capable of operating an operation system based on being stored in the memory 1932, the operation system being Windows Server™, Mac OS X™, Unix™, Linux™, FreeBSD™ or the like.

In the exemplary embodiment, there is further provided a non-volatile computer-readable storage medium including instructions, such as the memory 1932 including instructions. The instructions may be executed by the processing component 1922 of the device 1900 to complete the above method.

The present disclosure can be a system, a method and/or a computer program product. The computer program product may include a computer-readable storage medium that is uploaded with computer-readable program instructions for enabling the processor to fulfill each aspect of the present disclosure.

The computer-readable storage medium may be a physical device capable of maintaining and storing instructions to be executed by the device under instructions. The computer-readable storage medium, for example, can be but not limited to an electric memory device, a magnetic memory device, an optical memory device, an electromagnetic memory device, a semi-conductive memory device or any appropriate combination of the above. More specific examples (non-exhaustive list) of the computer-readable storage medium include: portable computer disk, hard disk, random access memory (RAM), read-only memory (ROM), erasable programmable read-only memory (EPROM or flash memory), static random access memory (SRAM), and portable compact disk read-only memory (CD-ROM), digital versatile disk (DVD), memory stick, soft disk, mechanical coding device, for example a punch card or a boss structure in a recess for storing instructions, and any appropriate combination of the above. The computer-readable storage medium here is not interpreted as the transient signal itself such as radio waves or other freely spreading electromagnetic waves, electromagnetic waves spreading through waveguides or other transmission media (e.g., optical pulses through fiber optic cables), or electrical signals transmitted by wires.

The computer-readable program instruction described herein can be downloaded from the computer-readable storage medium to each computing/processing device, or can be downloaded to an external computer or external storage device via a network, such as the Internet, a local network, a wide area network and/or a wireless network. The network may include copper transmission cables, optical fiber transmission, wireless transmission, routers, firewalls, switches, gateway computers and/or edge servers. The network adapter card or network interface in each computing/processing device receives computer-readable program instructions from the network and forwards the computer-readable program instructions for storage in the computer-readable storage medium in each computing/processing device.

The computer program instructions for performing the operations of the present disclosure may be assembly instructions, instruction set architecture (ISA) instructions, machine instructions, machine related instructions, microcode, firmware instructions, status setting data, or source code or target code written in one programming language or any combination of more than one programming languages, the programming languages including object-oriented programming languages such as Smalltalk, C++, and the like, as well as conventional procedural programming languages such as "C" or similar programming languages. The computer-readable program instructions may be executed entirely on the user's computer, partially executed on the user's computer, executed as an independent software package, executed partially on the user's computer and partially on a remote computer, or executed entirely on a remote computer or server. When a remote computer is involved, the remote computer may be connected to the user computer through any kind of network, including a local area network (LAN) or a wide area network (WAN), or may be connected to an external computer (e.g., via an Internet service provider via an Internet connection). In some embodiments, the electronic circuitry, such as a programmable logic circuit, a field programmable gate array (FPGA), or a programmable logic array (PLA), may be customized by utilizing the state information of the computer-readable program instructions, which may perform computer-readable program instructions, thereby achieving various aspects of the present disclosure.

Various aspects of the present disclosure is described referring to the flowcharts and/or block diagrams of the method, the apparatus (system) and the computer program product according to the embodiments of the present disclosure. It should be understood that each block of the flowcharts and/or the block diagrams and the combination of the blocks of the flowcharts and/or the block diagrams can be achieved by the computer-readable program instructions.

These computer-readable program instructions can be provided for a versatile computer, a special computer or a processor of other programmable data processing device, thereby producing a machine so that when these instructions are executed by a computer or a processor of other programmable data processing device, a device is produced for fulfilling the function/action specified in one or more blocks of the flowcharts and/or block diagrams. These computer-readable program instructions may also be stored in a computer-readable storage medium. These computer-readable program instructions enable a computer, a programmable data processing device and/or other devices to operate in a particular manner so that the computer-readable instructions storing the instructions include a manufactured product that includes instructions to implement various aspects of the function/action specified in one or more of the flowcharts and/or block diagrams.

The computer-readable program instructions may also be loaded onto a computer, other programmable data processing device, or other device such that a series of operational steps are performed on a computer, other programmable data processing device, or other device to produce a computer-implemented process, so that the instructions executed on a computer, other programmable data processing device, or other device performs the functions/actions specified in one or more of the blocks.

The flowcharts and block diagrams in the attached drawings show the possible architecture, functions and operations of the system, the method, and the computer program product according to various embodiments of the present disclosure. In this regard, each block in the flowchart or block diagram may represent a module, program segmentation or a part of an instruction that contains one or more executable instructions for implementing the prescribed logic functions. In some alternative implementations, the functions marked in the block may also occur in a different order from that noted in the drawings. For example, two successive blocks may actually be executed substantially simultaneously, or in an opposite order, which is determined by the function involved. It should be noted that, each block of the flowcharts and/or block diagrams and the combination of the blocks of the of the flowcharts and/or block diagrams may be implemented by a special hardware-based system for performing specified functions or actions, or by a combination of a special hardware and computer instructions.

While the foregoing has described the embodiments of the present disclosure, the above description is exemplary and non-exhaustive and is not limited to the disclosed embodiments. Without departing from the scope the present disclosure, various modifications and adaptions are obvious for common technicians in this field. The selection of terms in this description aims at best explanation of the principle, the actual application of the embodiment or the technical improvement for the technology in the market, or to enable other common technicians in this field to understand the embodiments disclosed in this description.

What is claimed is:

1. A video analysis apparatus, comprising:
   a foreground extraction unit configured to:
   extract a plurality of frames from an input video,
   determine an insect whole body binary image based on a brightness distortion value for the plurality of frames and an initial insect wing threshold area,
   determine an area of connected domains and a corresponding adjustment to an initial insect body threshold area for each frame in the plurality of frames,
   determine an adjusted insect body threshold area based on the determined adjustments, and
   determine an insect body binary image based on the brightness distortion value, the insect whole body binary image, and the adjusted insect body threshold area; and
   a 3D posture reconstruction unit, comprising:
   a feature point analysis sub-unit configured to:
   calculate initial feature points from the insect body binary image,
   generate a feature point signal subspace from calibrated feature points from the insect body binary image,
   train an iteration matrix based on the initial feature points and the calibrated feature points, wherein the trained iteration matrix is contained within the feature point signal subspace, and
   determine insect body ultimate feature points for each frame in the plurality of frames based on the trained iteration matrix and the initial feature points; and
   a posture reconstruction sub-unit configured to reconstruct an insect posture based on the insect body ultimate feature points.

2. The video analysis apparatus of claim 1, wherein the plurality of frames comprises a sub-video, and wherein the video analysis apparatus further comprises a video pre-processing unit configured to generate one or more sub-videos from the input video by:
   estimating a position, a dimension, and an initial appearance time for each insect arena of a plurality of insect arenas shown in the input video; and
   segmenting the input video to obtain a unique sub-video for each insect arena of the plurality of insect arenas, based on the position, dimension, and initial appearance time for the respective insect arena.

3. The video analysis apparatus of claim 2, wherein the foreground extraction unit is further configured to:
  divide a background of the one or more sub-videos;
  binarize each frame of the one or more sub-videos based on a root mean square of the brightness distortion value;
  determine a connected domain for each binarized frame of the one or more sub-videos; and
  select a connected domain larger than a particular threshold as a cavity range of the insect arena, wherein the position and dimension of the insect arena are estimated based on the cavity range.

4. The video analysis apparatus of claim 1, wherein the foreground extraction unit comprises an insect body estimation sub-unit configured to determine the adjusted insect body threshold area by:
  determining a preliminary insect body binary image based on the brightness distortion value, the whole body binary image, and the initial insect body threshold area;
  determining an average dimension for insects shown in the preliminary insect body binary image based on a known number of the insects and an insect body model for the insects;
  determining an average body area of the insects based on the average dimension for the insects; and
  limiting an area for an insect body detected in the preliminary insect body binary image based on the average body area.

5. The video analysis apparatus of claim 4, wherein the insect body estimation sub-unit is further configured to determine the area of connected domains and the corresponding adjustment to the initial insect body threshold area for each frame in the plurality of frames by:
  determining whether a number of connected domains is different from the known number of the insects;
  in response to the number of connected domains being different from the known number of the insects, clustering coordinates of each pixel in the frame; and
  determining an average dimension for the insects based on the clustered coordinates of each pixel in the frame.

6. The video analysis apparatus of claim 4, wherein the foreground extraction unit comprises an insect wing estimation sub-unit configured to:
  limit the area for the insect body by limiting an area for a set of insect wings detected in the preliminary insect body binary image based on the average body area;
  determine, for each frame in the plurality of frames, an adjustment to the initial insect wing threshold area based on the area of connected domains for the respective frame; and
  determine an adjusted insect wing threshold area based on the determined adjustments and the area for the set of insect wings.

7. The video analysis apparatus of claim 1, wherein the foreground extraction unit is configured to determine the corresponding adjustment to the initial insect body threshold area for each frame in the plurality of frames by:
  determining whether a number of connected domains is greater than a known number of insects shown in the plurality of frames; and
  determining whether an insect whole body connected domain comprises two or more connected domains, wherein the corresponding adjustment comprises a predetermined increase to the insect body threshold area in response to the number of connected domains being greater than the known number of insects and the insect whole body connected domain comprising two or more connected domains.

8. The video analysis apparatus of claim 1, wherein the feature point analysis sub-unit is further configured to:
  estimate a posture and basic body features of an insect shown in the insect body binary image, wherein the posture includes a position, direction, or inclining angle of the insect;
  calculate insect body initial feature points based on the posture and basic body features of the insect; and
  calculate insect wing initial feature points based on the whole body binary image.

9. The video analysis apparatus of claim 1, wherein the posture reconstruction sub-unit is further configured to:
  calculate a 3D coordinate of a wing connecting point based on the insect body ultimate feature points;
  calculate a wing fluttering angle and a wing inclining angle; and
  reconstruct an insect wing posture based on the 3D coordinate, the wing fluttering angle, and the wing inclining angle.

10. The video analysis apparatus of claim 1, further comprising a behavior identification unit, wherein the behavior identification unit comprises:
  a feature classification sub-unit configured to:
    classify features of an insect shown in the plurality of frames, and
    whiten training samples of the features of the insects, such that each feature has a same weight in the feature classification unit; and
  a behavior analysis sub-unit configured to train the feature classification unit based on the insect body ultimate feature points and calibrated behaviors.

11. A video analysis method, comprising:
  extracting a plurality of frames from an input video;
  determining an insect whole body binary image based on a brightness distortion value for the plurality of frames and an initial insect wing threshold area;
  determining an area of connected domains and a corresponding adjustment to an initial insect body threshold area for each frame in the plurality of frames;
  determining an adjusted insect body threshold area based on the determined adjustments;
  determining an insect body binary image based on the brightness distortion value, the insect whole body binary image, and the adjusted insect body threshold area;
  calculating initial feature points from the insect body binary image;
  generating a feature point signal subspace from calibrated feature points from the insect body binary image;
  training an iteration matrix based on the initial feature points and the calibrated feature points, wherein the trained iteration matrix is contained within the feature point signal subspace;
  determining insect body ultimate feature points for each frame in the plurality of frames based on the trained iteration matrix and the initial feature points; and
  reconstructing an insect posture based on the insect body ultimate feature points.

12. A video analysis apparatus, comprising:
  a processor; and
  a memory for storing instructions that can be executed by the processor,
  wherein the processor is configured to execute the video analysis method according to claim 11.

13. A non-transitory computer-readable medium, comprising computer-readable program instructions for enabling a processor to perform the video analysis method according to claim 11.

14. The video analysis method of claim 11, wherein the plurality of frames comprises a sub-video, and wherein extracting the plurality of frames comprises:
- estimating a position, a dimension, and an initial appearance time for each insect arena of a plurality of insect arenas shown in the input video; and
- segmenting the input video to obtain a unique sub-video for each insect arena of the plurality of insect arenas, based on the position, dimension, and initial appearance time for the respective insect arena.

15. The video analysis method of claim 14, further comprising:
- dividing a background of the one or more sub-videos;
- binarizing each frame of the one or more sub-videos based on a root mean square of the brightness distortion value;
- determining a connected domain for each binarized frame of the one or more sub-videos; and
- selecting a connected domain larger than a particular threshold as a cavity range of the insect arena, wherein the position and dimension of the insect arena are estimated based on the cavity range.

16. The video analysis method of claim 11, wherein determining the adjusted insect body threshold area further comprises:
- determining a preliminary insect body binary image based on the brightness distortion value, the whole body binary image, and the initial insect body threshold area;
- determining an average dimension for insects shown in the preliminary insect body binary image based on a known number of the insects and an insect body model for the insects;
- determining an average body area of the insects based on the average dimension for the insects; and
- limiting an area for an insect body detected in the preliminary insect body binary image based on the average body area.

17. The video analysis method of claim 16, wherein determining the area of connected domains and the corresponding adjustment to the initial insect body threshold area for each frame in the plurality of frames further comprises:
- determining whether a number of connected domains is different from the known number of the insects;
- in response to the number of connecting domains being different from the known number of insects, clustering coordinates of each pixel in the frame; and
- determining an average dimension for the insects based on the clustered coordinates of each pixel in the frame.

18. The video analysis method of claim 16, wherein limiting the area for the insect body further comprises limiting an area for a set of insect wings detected in the preliminary insect body binary image based on the average body area, and wherein the video analysis method further comprises:
- determining, for each frame in the plurality of frames, an adjustment to the initial insect wing threshold area based on the area of connected domains for the respective frame; and
- determining an adjusted insect wing threshold area based on the determined adjustments and the area for the set of insect wings.

19. The video analysis method of claim 11, wherein determining the corresponding adjustment to the initial insect body threshold area for each frame in the plurality of frames comprises:
- determining whether a number of connected domains is greater than a known number of insects shown in the plurality of frames; and
- determining whether an insect whole body connected domain comprises two or more connected domains, wherein the corresponding adjustment comprises a predetermined increase to the insect body threshold area in response to the number of connected domains being greater than the known number of insects and the insect whole body connected domain comprising two or more connected domains.

20. The video analysis method of claim 11, further comprising:
- determining, for each frame in the plurality of frames, an adjustment to the initial insect wing threshold area based on the area of connected domains for the respective frame; and
- determining an adjusted insect wing threshold area based on the determined adjustments.

21. The video analysis method of claim 11, wherein the initial feature points comprise insect body initial feature points and insect wing initial feature points, and wherein calculating the initial feature points from the insect body binary image comprises:
- estimating a posture and basic body features of an insect shown in the insect body binary image, wherein the posture includes a position, direction, or inclining angle of the insect;
- calculating insect body initial feature points based on the posture and basic body features of the insect; and
- calculating insect wing initial feature points based on the whole body binary image.

22. The video analysis method of claim 11, wherein the posture of the insect comprises an insect wing posture, and wherein reconstructing the posture of the insect comprises:
- calculating a 3D coordinate of a wing connecting point based on the insect body ultimate feature points; and
- calculating a wing fluttering angle and a wing inclining angle.

23. The video analysis method of claim 11, further comprising:
- classifying features of insects shown in the plurality of frames, wherein training samples of the features of the insects are whitened such that each feature has the same weight in feature classification; and
- training the feature classification based on calibrated behaviors and the insect body ultimate feature points.

* * * * *